US012351265B2

(12) United States Patent
Westergren et al.

(10) Patent No.: US 12,351,265 B2
(45) Date of Patent: Jul. 8, 2025

(54) AIRBAG SYSTEM FOR A POWERED SADDLE-RIDE TYPE VEHICLE AND A POWERED SADDLE-RIDE TYPE VEHICLE PROVIDED WITH SUCH SYSTEM (71) Applicant: PIAGGIO & C. S.P.A., Pontedera (IT)

(72) Inventors: Anders Westergren, Falköping (SE); Erik Rydsmo, Ljung (SE); Kenneth Backman, Amal (SE); Mikael Andersson, Alingsas (SE); Onorino Di Tanna, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 18/686,914

(22) PCT Filed: Sep. 6, 2022

(86) PCT No.: PCT/EP2022/074698
§ 371 (c)(1),
(2) Date: Feb. 27, 2024

(87) PCT Pub. No.: WO2023/036761
PCT Pub. Date: Mar. 16, 2023

(65) Prior Publication Data
US 2024/0383557 A1 Nov. 21, 2024

(30) Foreign Application Priority Data
Sep. 8, 2021 (EP) .................................... 21195576

(51) Int. Cl.
*B62J 27/20* (2020.01)
(52) U.S. Cl.
CPC ..................... *B62J 27/20* (2020.02)
(58) Field of Classification Search
CPC ......... B62J 27/20; B60R 21/215; B60R 21/20
See application file for complete search history.

(56) References Cited

U.S. PATENT DOCUMENTS 5,096,221 A * 3/1992 Combs .................. B60R 21/215
280/732
5,354,094 A * 10/1994 Matano ................ B60R 21/215
280/728.3
(Continued)

FOREIGN PATENT DOCUMENTS

DE 4127632 C1 * 2/1993 ............. B60R 21/16
EP 1375323 A2 1/2004
(Continued)

OTHER PUBLICATIONS

Extended European Search Report for Application No. 21195576.0 dated Feb. 1, 2022, 7 pages.
(Continued)

*Primary Examiner* — Frank B Vanaman
(74) *Attorney, Agent, or Firm* — MOSER TABOADA (57) ABSTRACT

An airbag system (1) for a powered saddle-ride type vehicle (100) is provided. The system comprises a housing (2): an airbag (6) arranged in said housing (2); and an inflator (7). The housing (2) is elongated and is configured to face the driver, and the housing (2) is configured to be fixedly mounted to a leg shield (102) next to the steering column (101) of the vehicle (100) in an area between handlebars (104) of the vehicle and a foot support (105) of the vehicle. The elongated housing (2) is configured to be mounted in a substantially horizontal direction, transverse to a longitudinally extending centreline (CL) of the vehicle (100). The inflator (7) is configured to allow the airbag (6), in the event of an activation signal, to inflate and deploy symmetrically on opposite sides of the longitudinally extending centreline (CL) of the vehicle (100) to thereby fill an available space between the vehicle and the driver's pelvis, abdomen, thorax and head area. Further, a powered saddle-ride type vehicle is provided.

14 Claims, 10 Drawing Sheets (56) References Cited

U.S. PATENT DOCUMENTS

| | | | | |
|---|---|---|---|---|
| 5,531,469 | A | * | 7/1996 | Iino .................. B29C 70/58 |
| | | | | 280/728.3 |
| 5,967,545 | A | * | 10/1999 | Iijima ................ B62J 27/20 |
| | | | | 280/739 |
| 2004/0051281 | A1 | * | 3/2004 | Miyata ............... B62J 27/20 |
| | | | | 280/730.1 |
| 2004/0256848 | A1 | | 12/2004 | Miyata et al. |
| 2005/0040628 | A1 | | 2/2005 | Miyata |
| 2006/0056943 | A1 | * | 3/2006 | Tsunoda ............. B62J 27/20 |
| | | | | 414/277 |

FOREIGN PATENT DOCUMENTS

| | | | | | |
|---|---|---|---|---|---|
| FR | | 2486483 | A1 | * 1/1982 | ............ B62J 27/00 |
| JP | | 2003011871 | A | 1/2003 | |
| JP | | 201852285 | A | 4/2018 | |

OTHER PUBLICATIONS

International Search Report and Written Opinion for Application No. PCT/EP2022/074698 dated Nov. 25, 2022, 8 pages.

\* cited by examiner

FIG. 8a

AIRBAG SYSTEM FOR A POWERED SADDLE-RIDE TYPE VEHICLE AND A POWERED SADDLE-RIDE TYPE VEHICLE PROVIDED WITH SUCH SYSTEM

TECHNICAL FIELD

The present invention relates to an airbag system for a powered saddle-ride type vehicle and a powered saddle-ride type vehicle provided with such airbag system.

TECHNICAL BACKGROUND

In a crash on a powered saddle-ride type vehicle, such as a scooter, a motorcycle, a snow mobile, etc. the driver is unrestrained. This means that the driver in the event of a frontal crash rapidly will move forward. The femur and the pelvis will initially take a high load before the driver makes a "diving" movement forward and hits the obstacle. It is known to provide powered saddle-ride type vehicles with an airbag to restrict the forward movement of the driver. However, there is a need for further improvements to better protect the driver from injuries.

SUMMARY OF THE INVENTION

It is an object of the present invention to overcome the above described drawbacks, and to provide an improved airbag system which is applicable to a powered saddle-ride type vehicle.

Another object is to provide an airbag system that allows loads to the pelvis and the femur to be reduced.

These and other objects that will be apparent from the following summary and description are achieved by an airbag system for a powered saddle-ride type vehicle according to the appended claims.

According to an aspect of the present invention, there is provided an airbag system for a powered saddle-ride type vehicle, the airbag system comprising a housing;
an airbag arranged in said housing; and
an inflator;
characterized in
that the housing is elongated and is configured to face the driver, and wherein the housing is configured to be fixedly mounted to a leg shield next to the steering column of the vehicle in an area between handlebars of the vehicle and a foot support of the vehicle, and wherein the elongated housing is configured to be mounted in a substantially horizontal direction transverse to a longitudinally extending centreline of the vehicle; and
in that the inflator is configured to allow the airbag, in the event of an activation signal, to inflate and deploy symmetrically on opposite sides of the longitudinally extending centreline of the vehicle to thereby fill an available space between the vehicle and the driver's pelvis, abdomen, thorax and head area.

Accordingly, an airbag system is provided which is specifically developed for vehicles of the type where the driver is seated in a non-belted condition and, and which vehicles lack safety arrangements of the type which are integrated in cars, such as deformation zones and cage structures formed by a plurality of pillars.

The present airbag system is specifically developed to allow an early coupling of the driver to prevent the driver, not only from tipping forward and coming in contact with the obstacle, but also from coming in contact with the handlebars and the steering column in the event of a frontal crash but also with the leg shield. Thereby the pelvis, abdomen, thorax and head area of the driver will be better protected since a large amount of the energy will be absorbed by the airbag. Thereby, it has been shown that it is made possible to reduce the loads to the femur and pelvis of the driver.

By arranging the housing on the leg shield next to the steering column of the vehicle, the airbag system will be arranged in an area where it is not in conflict with the otherwise strictly limited dashboard area that is available on this type of vehicles. Further, by packing the airbag in an elongated housing, the thickness of the housing may be substantially reduced which is of importance since the available space between the saddle and the leg shield is limited. It is hence of importance that the housing does not unduly restrict the available leg space.

The airbag may be arranged in the housing in a rolled condition, in a folded condition or in a combined rolled and folded condition.

The airbag may be symmetrically arranged in the housing with an extension on opposite sides of the inflator.

The housing may comprise a cover configured to face the driver, and the cover may comprise a split line having an extension forming an open loop, whereby said cover upon an activation of the inflator is configured to rupture long said split line, thereby forming a flap like deflector configured to guide the deployment of the airbag in a direction transverse to the longitudinal extension of the elongated housing. Thereby the airbag will efficiently deploy and fill the available space between the handlebars/steering column of the vehicle and the pelvis, abdomen, thorax and head area of the driver. The split line may be formed by a local structurally weaker zone in the material from which the housing is formed.

The housing may in one embodiment comprise a split line having an extension along at least a portion of the circumference of the housing, whereby said housing upon an activation of the inflator is configured to rupture long said split line, thereby forming a flap like deflector configured to guide the deployment of the airbag in a direction transverse to the longitudinal extension of the elongated housing.

The split line may be formed by the interface between a front wall of the housing configured to face the driver and a bracket forming a rear wall of the housing.

The housing may be arranged substantially in level with the driver's knees as seen in a normal driving position. By arranging the housing of the airbag system in level with the driver's knees it has been shown that it is made possible to even better reduce the loads to the femur and pelvis of the driver.

The housing and/or a cover thereof may comprise a padding on an exterior surface thereof.

The airbag may upon an activation thereof be configured to be inflated and deployed to form an inflated body having a lower portion, a middle portion and an optional upper portion, said middle portion having a larger partial volume than the lower portion and the optional upper portion respectively.

The lower portion of the airbag may thereby in the inflated and deployed condition be received in a position between the drivers' knees/thighs while the middle portion of the airbag may abut the driver's pelvis/abdomen/thorax area. Further, in the event the airbag also comprises an upper portion, this may be arranged in the chest/facial area between the driver's arms. Correspondingly, the opposite side of the airbag, facing away from the driver, will in the inflated and deployed condition abut the handlebars/steering column and thereby prevent the airbag, and hence also the driver's body from tipping forward. Also, an early coupling with the driver's femur and pelvis area will be enabled. Further, the airbag will absorb energy in the abdomen and thorax area. The loads to the femur and pelvis can thereby be reduced and the driver's upper body is prevented from hitting the obstacle.

The lower portion may in an inflated and deployed condition of the airbag have a width as seen along the longitudinal direction of the housing which is smaller than the distance between the drivers' knees as seen in a normal, seated driving position. Thereby, an early coupling with the driver's femur and pelvis area will be enabled and the loads to the femur and pelvis can thereby be reduced.

The lower portion may in an inflated and deployed condition of the airbag comprise two knee-protecting portions, each portion extending in a direction transverse to the longitudinal centreline of the vehicle. Thereby, an early coupling with the driver's knees and the femur and pelvis area will be enabled and the loads applied thereto can be reduced.

The middle portion of the airbag may in the inflated and deployed condition of the airbag have a width as seen along the longitudinal direction of the housing which is smaller than the distance between the handlebars of the vehicle but smaller than the width of the lower portion of the airbag. As a difference from a correctly belted driver of a car, the driver of this type of vehicles will, as long as the grip of the handlebars is remained, have her arms projecting in the forward direction and also often with the body slightly leaning forward. By the invention, the airbag will better fill the volume between the driver's arms and chest area and further restrict the forward tipping of the driver's body in the event of a frontal crash.

The middle portion of the airbag may, as seen in the inflated and deployed condition of the airbag, be configured to abut the pelvis, abdomen and thorax area of the driver. It is preferred that the middle portion has a width that allows the pelvis, abdomen and thorax area to be moved in a sideward direction during a crash without losing contact with the intended abutment surface of the airbag. Thereby the airbag system will be highly efficient also in the event of non-strict frontal crashes.

The middle portion of the airbag may as seen in the inflated and deployed condition of the airbag have a substantially flat surface portion configured to abut the pelvis, abdomen and thorax area of the driver. Thereby, the risk of the driver sliding off in the sideward direction will be substantially reduced as compared to a surface portion having a convex curvature.

The upper portion of the airbag may, as seen in the inflated condition of the airbag, have a width that is smaller than the width of the middle portion of the airbag. The upper portion will thereby be enabled to be better accommodated in the interspace between the driver's arms which during driving are extending in the forward direction to hold the handlebars.

According to another aspect, a powered saddle-ride type vehicle is provided which comprises an airbag system according to any of claims 1-14, wherein the housing is fixedly mounted to a leg shield next to a steering column of the vehicle in an area between handlebars of the vehicle and a foot support of the vehicle.

The housing may be arranged substantially in level with a driver's knees as seen in a normal driving position. The skilled person realizes that the level of a driver's knees depends on the length of the driver which depends from person to person. Hence, the term "level" should be understood as an area having a limited vertical extension rather than a horizontal line.

The airbag system as such and its advantages have been thoroughly described above. Those arguments are equally applicable to a powered saddle-ride type vehicle which uses such airbag system. Thus, in order of avoiding undue repetition, reference is made to the sections above.

Non-limiting examples of a saddle-ride type vehicle are motorcycles, scooters, mopeds, water jet skis and snow mobiles.

BRIEF DESCRIPTION OF THE DRAWINGS

The disclosure will be described in more detail with reference to the appended schematic drawings, which show an example of a presently preferred embodiment of the disclosure.

DETAILED DESCRIPTION

The present disclosure will now be described more fully hereinafter with reference to the accompanying drawings, in which currently preferred embodiments of the disclosure are shown. The present disclosure may however be embodied in many different forms and should not be construed as limited to the embodiments set forth herein. Rather, these embodiments are provided for thoroughness and completeness, and to fully convey the scope of the disclosure to the skilled addressee. Like reference characters refer to like elements throughout.

Figure 1A:
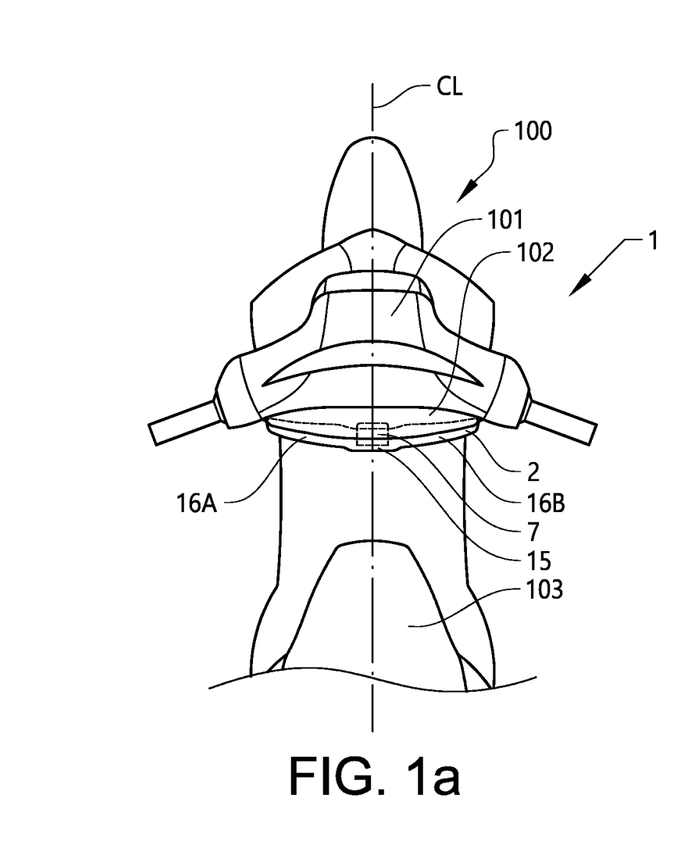
FIGS. 1a and 1b are highly schematic illustrations of the intended position of the housing.
Figure 1B:
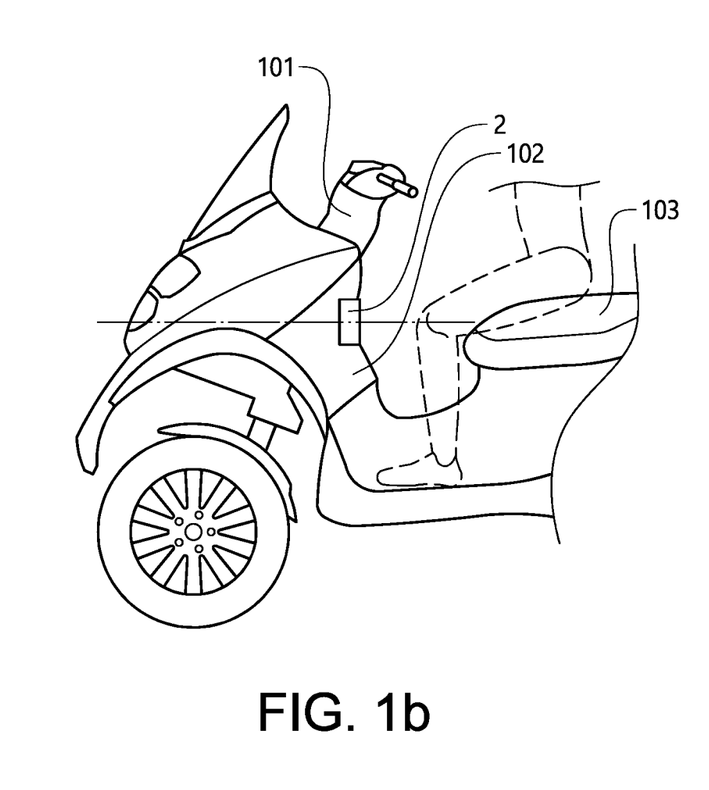

Starting with FIGS. 1a and 1b, the invention refers to an airbag system 1 for a powered saddle-ride type vehicle 100. In the context of the invention, the term "powered saddle-ride type vehicle" is to be understood as a vehicle where the driver in the ordinary use of the vehicle is seated in a sitting position on a saddle. A non-exhaustive list of vehicles of this type includes a motorcycle, a scooter, a moped, a water jet ski or a snow mobile. Thus, the invention provides an airbag system 1 which is specifically developed for a vehicle 100 of the type where the driver is seated in a non-belted condition, and where the vehicle lacks safety arrangements which are typically integrated in cars, such as deformation zones, a cage structure and numerous airbags.

The inventive airbag system 1 comprises, in its broadest aspect, an elongated housing 2 which is configured to be fixedly mounted next to a steering column 101 of the vehicle 100, and more precisely to a leg shield 102 of the steering column 101 of the vehicle 100. The housing 2 may be arranged in level with the driver's knees as seen in the driver's normal driving position. The driver's knees are typically substantially in level with the saddle 103. As given above, the skilled person realizes that the level of a driver's knees depends on the length of the driver which depends from person to person. Hence, the term "level" should be understood as an area having a limited vertical extension rather than a horizontal line.

The elongated housing 2 is configured to be mounted in a substantially horizontal direction, and transverse to a longitudinally extending centreline CL of the vehicle. This centreline is often referred to as the Y-axis by the skilled person in the vehicle industry. The housing 2 may be arranged symmetrically with the longitudinally extending centreline CL. The housing has a thickness that is substantially smaller than its height and longitudinal extension.

Figure 2:
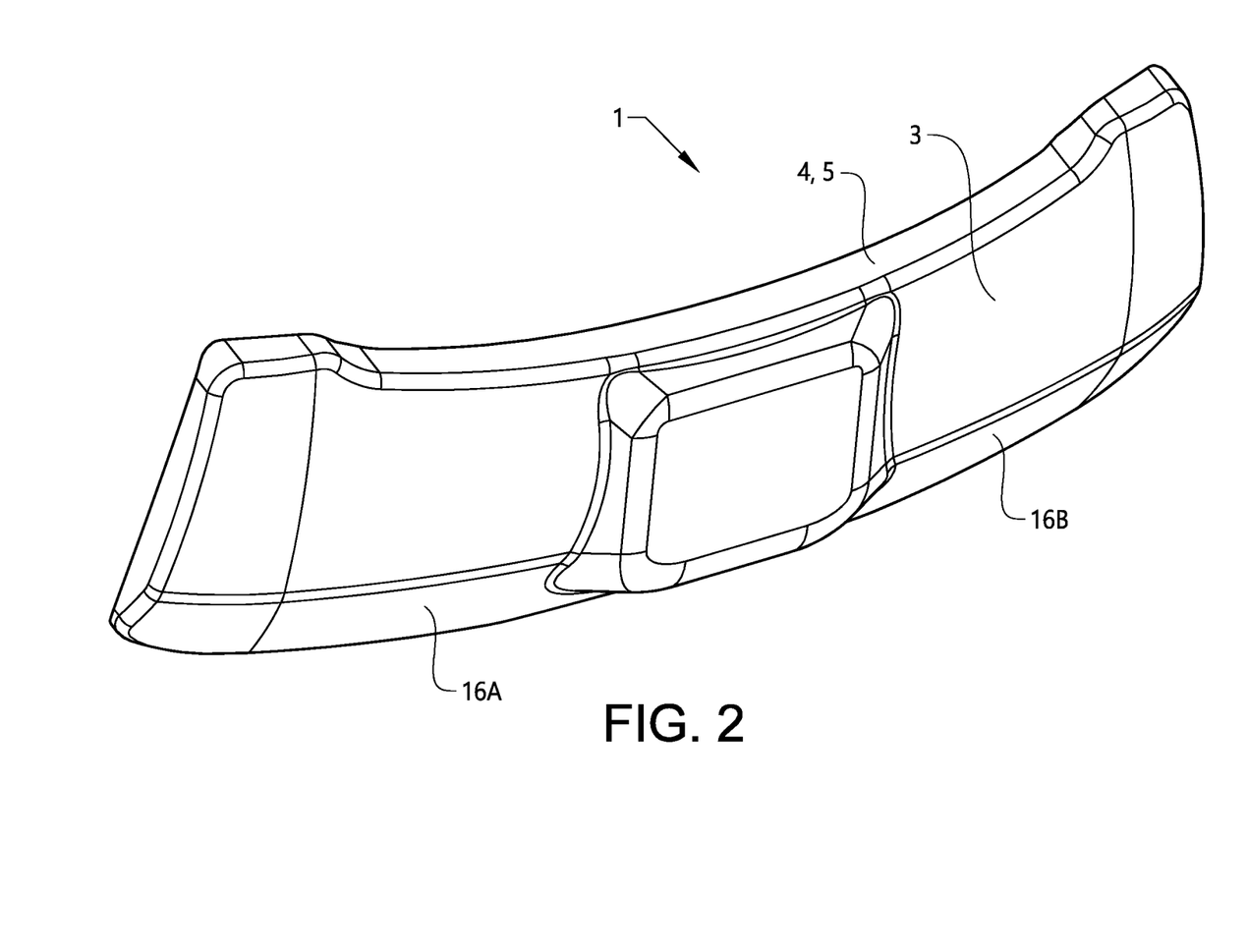
FIG. 2 a perspective view of the housing.

Now turning to FIG. 2, one embodiment of the elongated housing 2 according to the invention is disclosed. The housing 2 has an elongated shape and comprises a cover 3 configured to face the driver and a bracket 4 forming a rear wall 5 of the housing 2. The cover 3 and the bracket 4 do together define a closed volume that is configured to contain an airbag and an inflator. The elongated housing comprises two flanks 16A and 16B.

Figure 3:
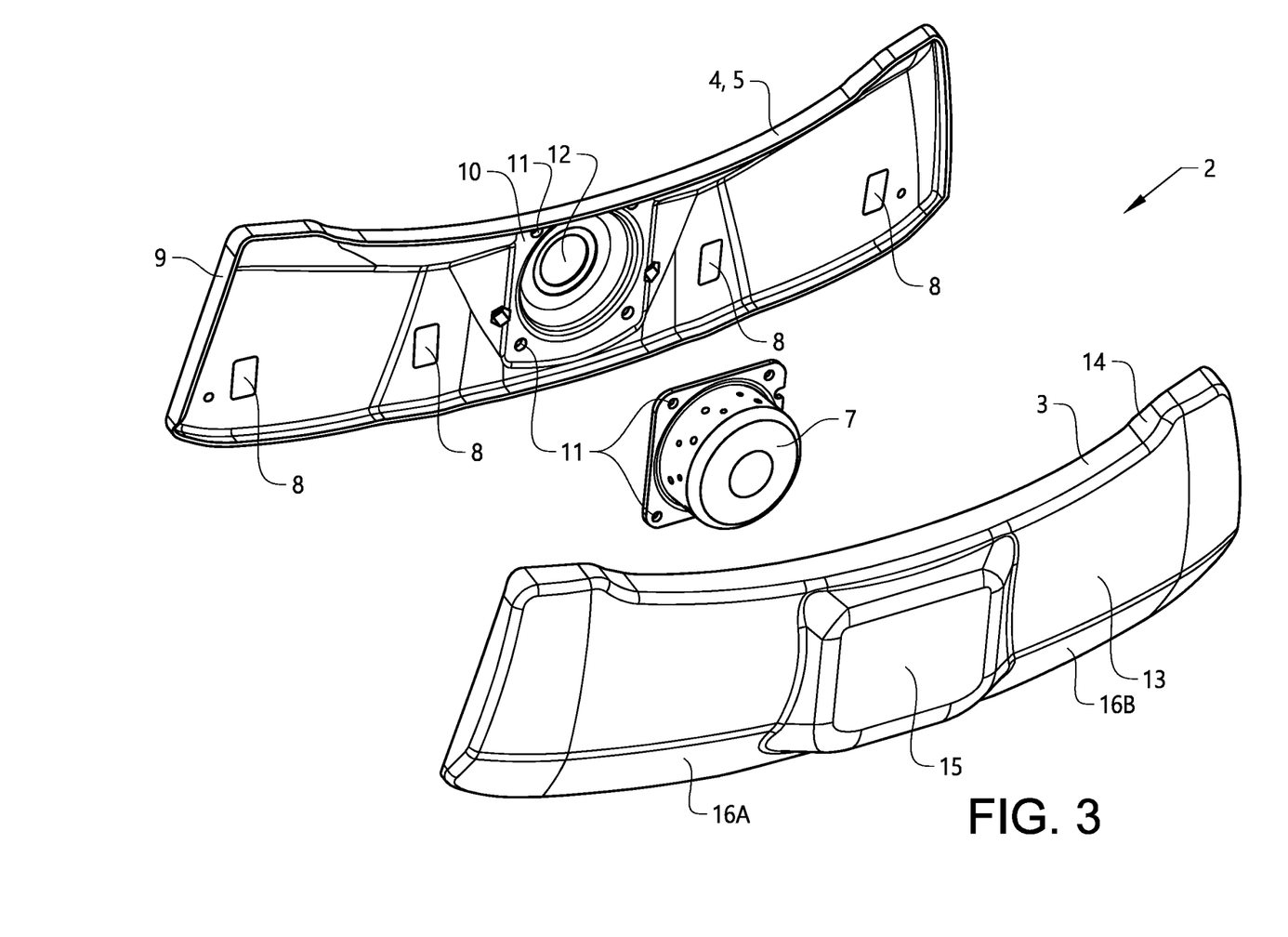
FIG. 3 is an exploded perspective view of the housing without the airbag.

Turning to FIG. 3, an exploded view of the housing 2 is disclosed. The airbag has been omitted to facilitate understanding. The bracket 4 which forms the rear wall 5 of the housing 2 comprises a plurality of throughgoing holes 8 configured to allow the housing 2 to be fixedly mounted to the leg shield 102 which as such is directly or indirectly supported by the steering column of the vehicle 100. Further, the bracket 4 comprises a circumferential rim portion 9 configured to sealingly engage the cover 3. The bracket 4 comprises a central portion 10 configured to support the inflator 7. The inflator 7 is in the disclosed embodiment configured to be fixedly arranged to the bracket 4 by means of four screws or rivets (not illustrated) via a group of mating holes 11 in the inflator 7 and the bracket 4 respectively. The central portion 10 comprises a through-going opening 12 configured to receive wiring (not illustrated) required for the operation of the inflator 7.

The housing 2 and especially its bracket 4 may have an overall surface extension that corresponds to the surface extension of the leg shield 102 to which it is configured to be fixedly mounted. The bracket 4 may accordingly have a substantially flat surface extension or a curved extension.

The inflator 7, which as such is well known in the art of airbag systems 1, may comprise a non-disclosed gas generator.

The inflator 7 is configured to be connected to an ECU (Electrical Control Unit) of the vehicle 100 and to be activated based on an activation signal which is indicating a frontal crash. This may be made by using one or more sensors on the vehicle.

The cover 3 comprises a front wall 13 which in turn comprises a circumferential rim portion 14 configured to sealingly engage the circumferential rim portion 9 of the bracket 4. The interface between the bracket 4 and cover 3 may be provided with a sealing member (not illustrated).

The cover 3 is configured to be mounted to the bracket 4 to form a closed and sealed housing. This may be made by e.g. screwing, snap-fits, welding, adhesive bonding. The closure may be made tamper-proof. It is preferred that the closure is made to resist humidity and rain.

A central portion 15 of the cover 3 comprises an area having a locally enlarged depth, thereby allowing accommodation of the inflator 7. It is preferred that the inflator 7 is centrally arranged in the housing 2. Thus, the inflator 7 is arranged in a central position of the housing 2 where the housing 2 has a locally enlarged depth as compared to the depth of the two opposing flanks 16A, 16B of the housing 2.

In a position when the housing 2 is mounted to the vehicle 100 transverse to and preferably also symmetrically with the longitudinally extending centreline CL of the vehicle, the inflator 7 will be axially aligned with the longitudinally extending centreline CL of the vehicle 100 and the two flanks 16A, 16B of the housing 2 will be arranged on opposite sides of the centreline CL. This is best illustrated in FIG. 1a. The locally thicker central portion 15 of the cover 3, and the thinner flanks 16A, 16B will thereby not unduly infringe with the available leg space of the vehicle 100.

The cover 3 may comprise an optional padding (not illustrated) on an exterior surface thereof. Such optional padding may serve as a knee-protection on the leg shield during ordinary use of the vehicle.

Figure 4A:
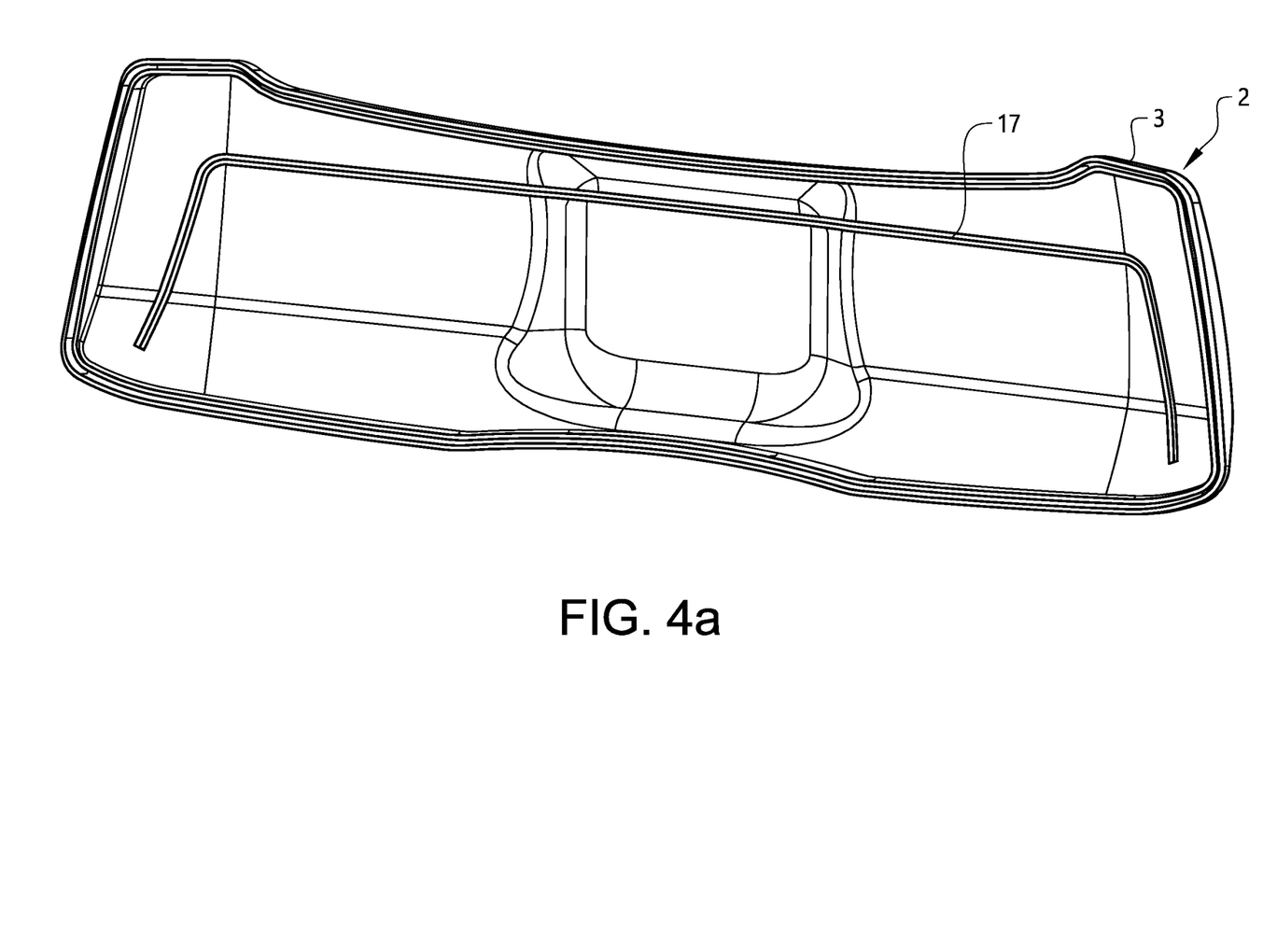
FIG. 4a is a perspective view of the inner wall of a cover forming part of the housing.
Figure 4B:
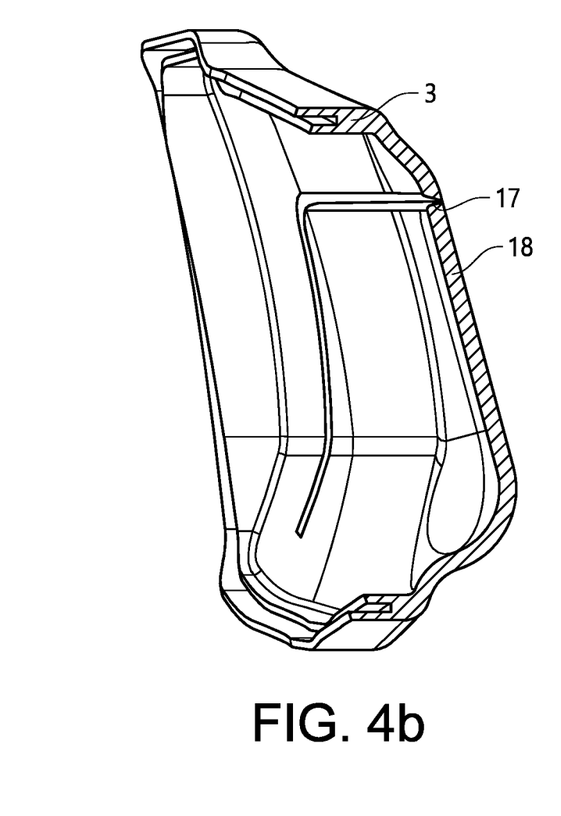
Fig.4b is a cross-sectional view of the cover in its ordinary use.

Now turning to FIGS. 4a and 4b, a perspective view and a cross-sectional view respectively of the cover 3 is disclosed. The cover 3 comprises a split line 17. The split line 17 has, as is best seen in FIG. 3a, an extension forming an open loop. The split line 17 may be formed by a local structurally weaker zone in the material from which the housing 2 is formed. The split line 17 may be formed in the inner wall portion of the cover 3 as is disclosed in FIG. 4a. The skilled person realizes that the split line 17, with remained function, may be formed in the outer wall portion of the cover 3. In another embodiment, the housing 2 may instead comprise a split line 17 which has an extension along at least a portion of the circumference of the housing 2.

Figure 4C:
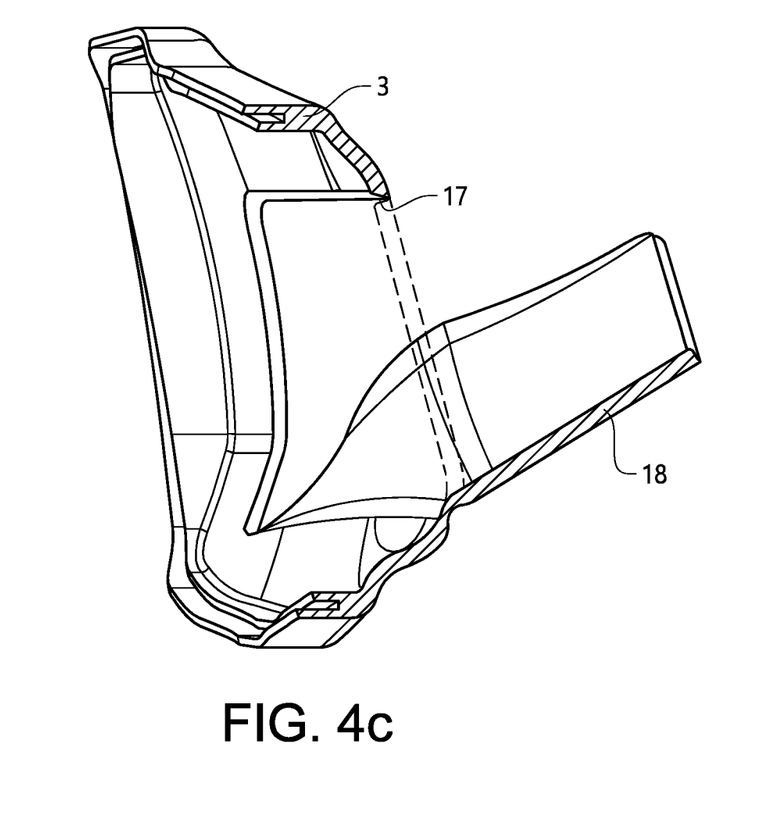
FIG. 4c is a cross-sectional view of the cover in a state after activation of the inflator.

No matter design of the split line 17, the cover 3 or the housing 2 is configured, upon an activation of the inflator 7, to rupture long said split line 17, thereby forming a flap like deflector 18, see FIG. 4c. The deflector 18 is configured to guide the deployment of the airbag in a direction transverse to the longitudinal extension of the elongated housing 2. Thereby the airbag will be allowed to be efficiently deployed and fill the available space between the handlebars of the vehicle and the pelvis, abdomen and thorax area of the driver. In the event the housing 2 is centrally arranged in view of the longitudinally extending centreline CL, the deployment will be symmetrical in said available space.

This will be further discussed below. To facilitate the understanding both the inflator and the airbag have been omitted in FIGS. 4a-4c.

Figure 5A:
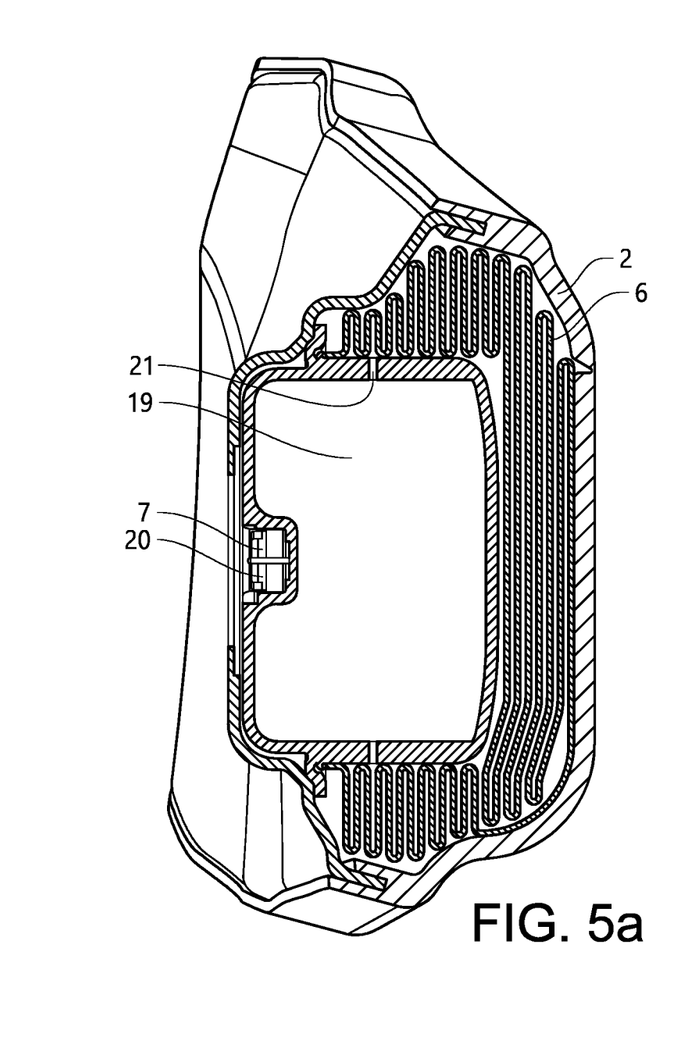
FIG. 5a is a schematic cross-section of the housing disclosing the airbag as being packed in a folded condition.
Figure 5B:
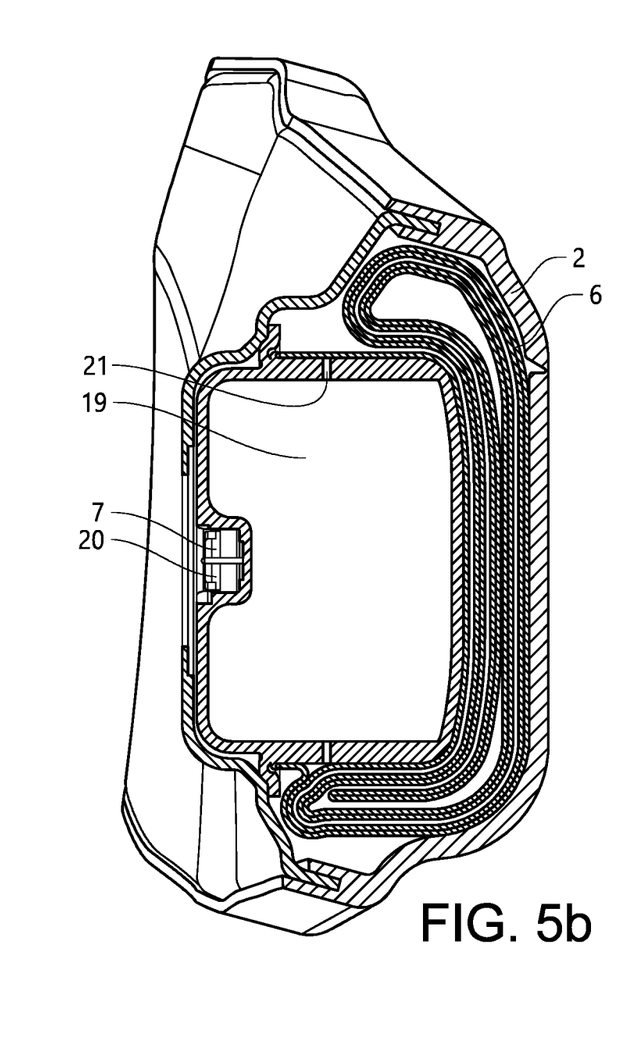
FIG. 5b is a schematic cross-section of the housing disclosing the airbag as being packed in a rolled condition.

Now turning to FIG. 5a, a schematic cross section of the housing 2 with an airbag 6 packed therein is disclosed. The airbag 6 is disclosed as being packed in the housing 2 in a folded condition. The folding is disclosed as being made in a zig-zag fashion. The skilled person realizes that the folding may be made in a number of ways with remined function, where the folding pattern is adapted to the overall geometry of the airbag 6 and to its intended deployment. FIG. 5b discloses an alternative embodiment wherein the airbag 6 instead is packed in a rolled condition.

As can be seen in those two embodiments, the airbag 6 is arranged in fluid connection with a gas chamber 19 of the inflator 7. Hence, as the inflator 7 is activated, in the event of a detected emergency situation involving a frontal crash, a gas generator 20 which forms part of the inflator 7 will be activated and generate a gas flow which inflates the airbag 6 via the gas chamber 19. The gas enters the airbag 6 via one or more openings 21 in the wall portion of the inflator 7. As the airbag 6 inflates, the split line 17, see FIGS. 4*a*-4*c*, will break to thereby form said deflector 18.

Although the airbag 6 has been exemplified as being arranged in the housing 2 in a rolled condition or folded in a zig-zag pattern, the skilled person realizes that other patterns or combinations of different patterns may be used. No matter how the airbag 6 is packed in the housing 2, it is preferred that the airbag 6 is symmetrically arranged in the housing 2 with a symmetric extension along the opposing flanks 16A, 16B on opposite sides of the inflator 7. Further, it is preferred, no matter pattern, that the airbag 6 is symmetrically inflated and symmetrically deployed on opposite sides of the longitudinal centreline CL of the vehicle.

The airbag 6 may, as is well known in the art, be made of a flexible fabric material. The material may be a textile material such as a woven or non-woven material. The material may be plastic or composite material. The airbag 6 may be provided with tethers and other types of elements to control the deployment.

Figure 6:
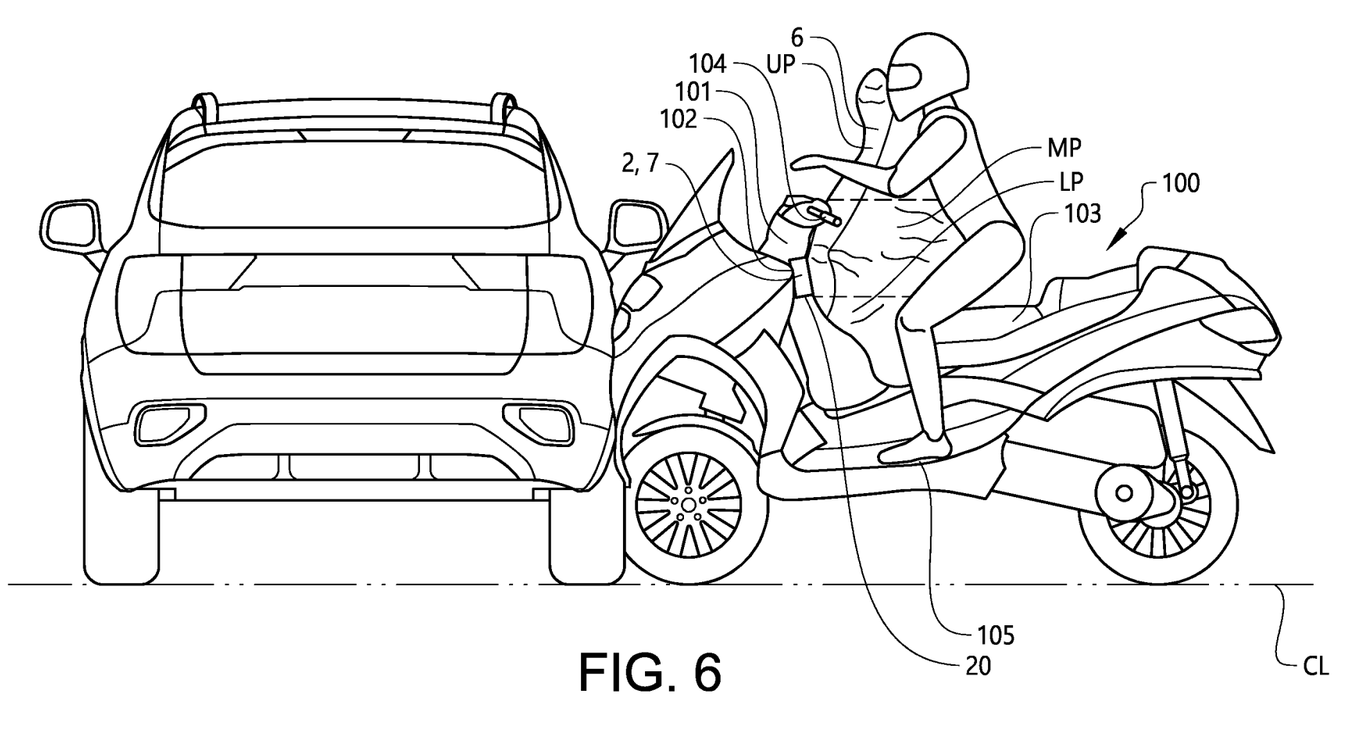
FIG. 6 is a schematic view if a frontal crash between a car and a powered saddle-ride type vehicle.

Now turning to FIG. 6, the operation of the airbag system 1 according to the invention is disclosed.

The elongated housing 2, containing the inflator 7 and the packed airbag is fixedly mounted to the leg shield 102 of the steering column 101 of the vehicle 100. The housing 2 is illustrated as being arranged in level with the driver's knees as seen in the normal seated position of the driver. It is however to be understood that the housing 2 with remained function may be arranged in other vertical positions in as seen in the area between the handlebars 104 of the vehicle and a foot support 105 of the vehicle.

The elongated housing 2 is mounted to extend in the horizontal direction and transverse to the longitudinally extending centreline CL of the vehicle 100. The elongated housing 2 is preferably also arranged symmetrically with the longitudinally extending centreline CL of the vehicle 100.

The inflator 7 is arranged in communication with the ECU (not illustrated) of the vehicle in a manner which is well known the skilled person.

In the event a processor of the ECU, based on collected and processed signals from sensors on the vehicle should determine that there is a frontal crash, an activation signal will be communicated to the inflator 7 which activates the gas generator 20. The gas generator 20 generates a gas flow which inflates the airbag 6. The airbag 6 will inflate and deploy symmetrically on opposite sides of the longitudinally extending centreline CL of the vehicle to thereby fill an available space between the handlebars 104 of the vehicle and the pelvis, abdomen, thorax and head area of the driver. Thereby an early coupling of the driver is provided which prevents the driver, not only from tipping forward and coming in contact with the obstacle, but also from coming in contact with one or more of the handlebars 104, the steering column 101 and the leg shield 102 in in the event of a frontal crash. Thereby the pelvis, abdomen, thorax and head area of the driver will be better protected since a large amount of the energy will be absorbed by the airbag 6. Further, in the event the housing 2 of the airbag system 1 is arranged in level with the driver's knees, it has been shown that it is made possible to better reduce the loads to the femur and pelvis.

By arranging the housing 2 on the leg shield 102 of the vehicle 100, the airbag system 1 will be arranged in an area where it is not in conflict with the otherwise strictly limited dashboard area that is available on this type of vehicles 100. Further, by packing the airbag 6 in an elongated housing 2, the thickness of the housing 2, and especially its opposing flanks 16A, 16B may be substantially reduced which is of importance since the available space between the saddle 103 and the leg shield 102 is limited in order of not unduly restricting the leg space for the driver. The latter is of importance for the overall driver's comfort.

The airbag 6 may have different configurations in its deployed condition in order of providing a coupling of the driver which prevents the driver from tipping over in the event of a frontal crash.

Figure 7A:
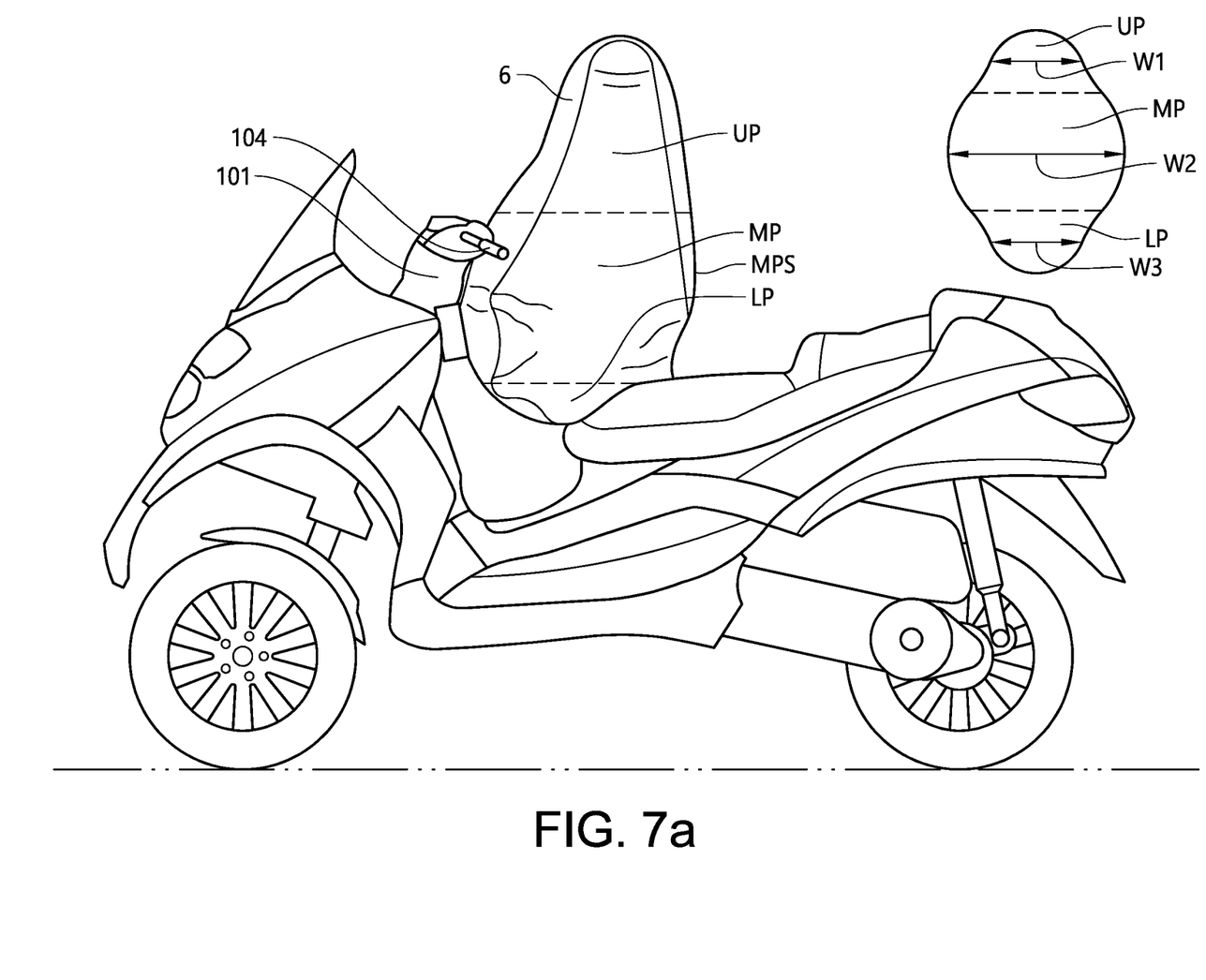
FIG. 7a discloses one embodiment of a powered saddle-ride type vehicle in a condition when a first design of the airbag has been inflated and deployed.

Turning to FIGS. 6 and 7*a*, a first embodiment of the airbag 6 is disclosed. The airbag 6 may upon an activation thereof be configured to be inflated and deployed to form an inflated body having a lower portion LP, a middle portion MP and an optional upper portion UP, where the middle portion MP has a larger partial volume than the lower portion LP and the optional upper portion UP respectively.

The lower portion LP of the airbag 6 will thereby in the inflated and deployed condition be received in a position between the drivers' knees/thighs while the middle portion MP of the airbag 6 will abut the driver's pelvis/abdomen/thorax area. Further, in the event the airbag 6 also comprises an upper portion UP, as is disclosed in FIGS. 6 and 7*a*, this will be arranged in the chest/facial area between the driver's arms, i.e. in the head area. Correspondingly, the opposite side of the airbag 6 facing away from the driver will in the inflated and deployed condition abut the handlebars 104 and the steering column 101 and thereby prevent the airbag 6, and hence also the driver's body from tipping forward. Also, an early coupling with the driver's femur/pelvis area will be enabled. Further, the airbag 6 will absorb energy in the pelvis/abdomen/thorax area. The loads to the femur and pelvis can thereby be reduced and the driver's upper body is prevented from hitting the obstacle.

The upper portion UP may, as seen in the inflated and deployed condition of the airbag 6, have a width W1 that is smaller than the width of the middle portion W2. The upper portion UP will thereby be enabled to be better accommodated in the interspace between the driver's arms which during driving are extending in the forward direction to hold the handlebars 104. Further, the lower portion LP has a width W3 that smaller than the width W2 of the middle portion MP. The lower portion LP may in an inflated and deployed condition of the airbag have a width as seen along the longitudinal direction of the housing which is smaller than the distance between the drivers' knees as seen in a normal, seated driving position.

Figure 7B:
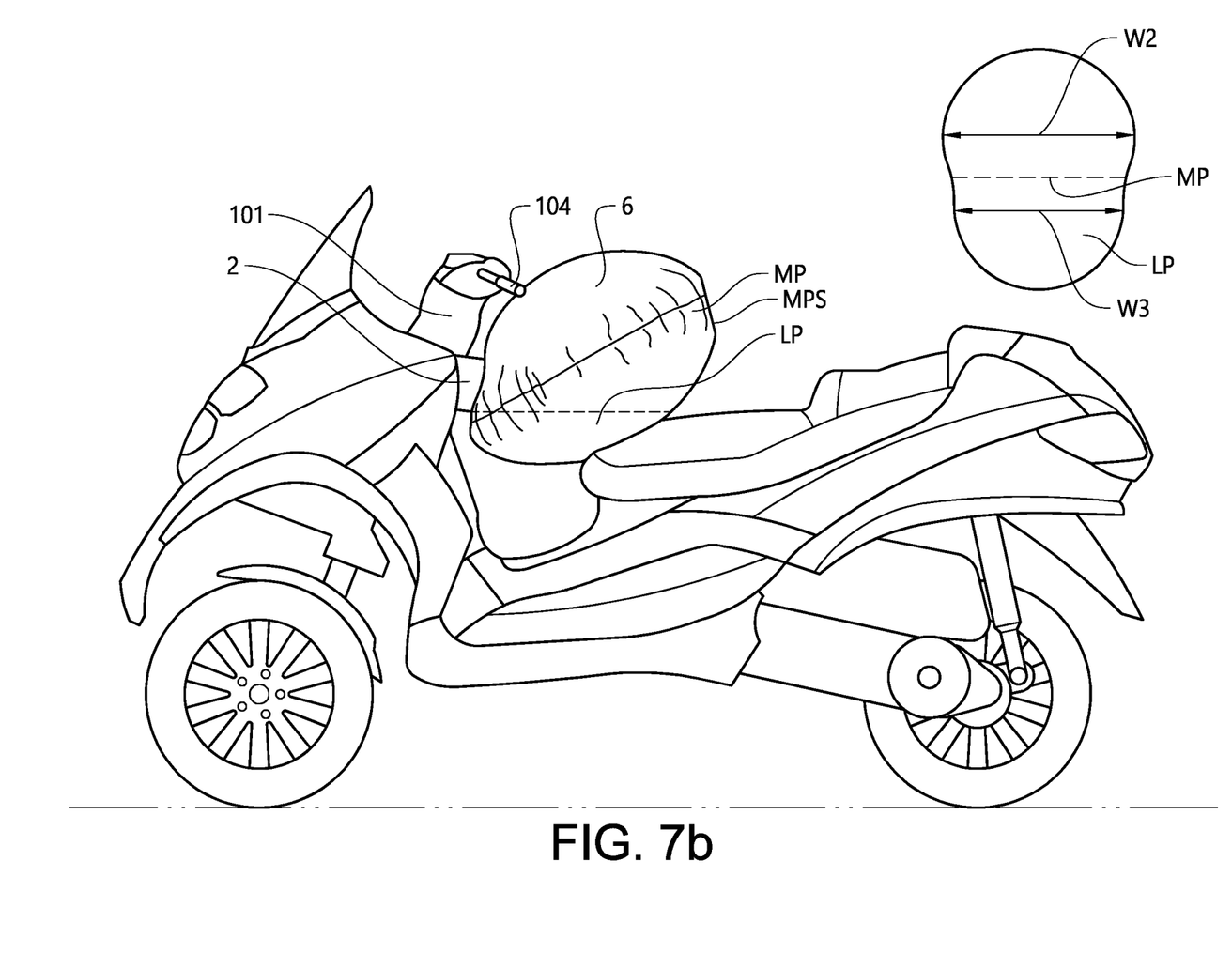
FIG. 7b discloses one embodiment of a powered saddle-ride type vehicle in a condition when a second design of the airbag has been inflated and deployed.

FIG. 7*b*, discloses an alternative embodiment of the inflated and deployed airbag 6 which comprises a lower portion LP and a middle portion MP. Hence, the airbag 6 do not have the upper portion disclosed in FIG. 7*a*. Accordingly, in this embodiment, the lower portion LP of the airbag 6 will in the inflated and deployed condition be received in a position between the drivers' knees/thighs while the middle portion MP of the airbag 6 will abut the driver's pelvis/abdomen/thorax area. No dedicated coupling of the drivers' head/facial area will be provided for by this airbag design. The opposite side of the airbag 6 facing away from the driver will in the inflated and deployed condition abut the handlebars 104 and the steering column 101 and thereby prevent the airbag 6, and hence also the driver's body from tipping forward. Also, an early coupling with the driver's femur/pelvis area will be enabled. Further, the airbag 6 will absorb energy in the pelvis/abdomen/thorax area. The loads to the femur and pelvis can thereby be reduced and the driver's upper body is prevented from hitting the obstacle.

No matter if the airbag 6 comprises an upper portion UP or not that is dedicated to provide a coupling of the drivers head/facial area, the lower portion LP of the airbag 6 may in an inflated and deployed condition of the airbag 6 have a width W3 as seen along the longitudinal direction of the housing 2 which is smaller than the distance between the drivers' knees as seen in a normal driving position. Thereby, an early coupling with the driver's femur/pelvis area will be enabled and the loads to the femur and pelvis can thereby be reduced.

The middle portion MP may in the inflated and deployed condition of the airbag 6 have a width W2 as seen along the longitudinal direction of the housing 2 which is smaller than the distance between the handlebars 104 of the vehicle 100 but smaller than the width W3 of the lower portion LP. As a difference from a correctly belted driver of a car, the driver of this type of vehicles will, as long as the grip of the handlebars 104 is remained, have her arms projecting in the forward direction and also often with her body slightly leaning forward. By the invention, the airbag 6 will better fill the volume between the driver's arms and chest and further restrict the forward tipping of the driver's body in the event of a forward crash.

The middle portion MP may, as seen in the inflated and deployed condition of the airbag 6, be configured to abut the pelvis, abdomen and thorax area of the driver. It is preferred that the middle portion MP has a width W2 that allows the pelvis, abdomen and thorax area to be moved in a sideward direction in view of the longitudinal centreline during a crash without losing contact with the intended abutment surface of the airbag 6. Thereby the airbag system will be highly efficient also in the event of non-strict frontal crashes.

The middle portion MP may as seen in the inflated and deployed condition of the airbag 6 have a substantially flat surface portion MPS, see FIGS. 7a and 7b, configured to abut the pelvis, abdomen and thorax area of the driver. Thereby, the risk of the driver sliding off in the sideward direction will be substantially reduced as compared to a surface portion having a convex curvature.

Figure 8A:
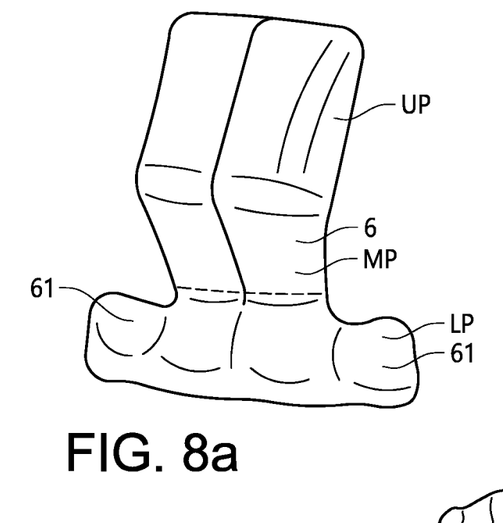
FIGS. 8a-8c disclose, highly schematically, three different embodiments of airbags with knee-protections.
Figure 8B:
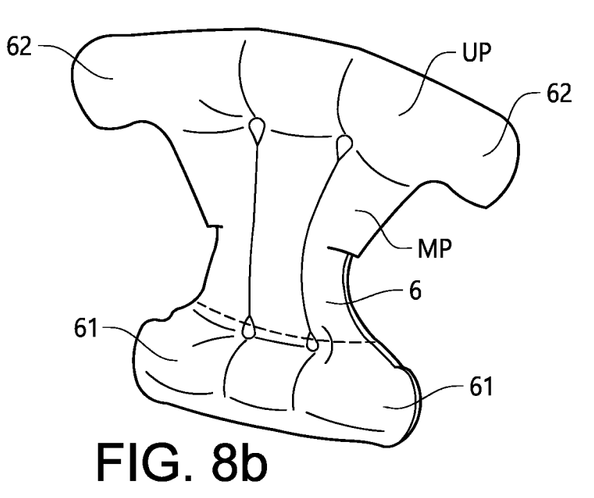
Figure 8C:
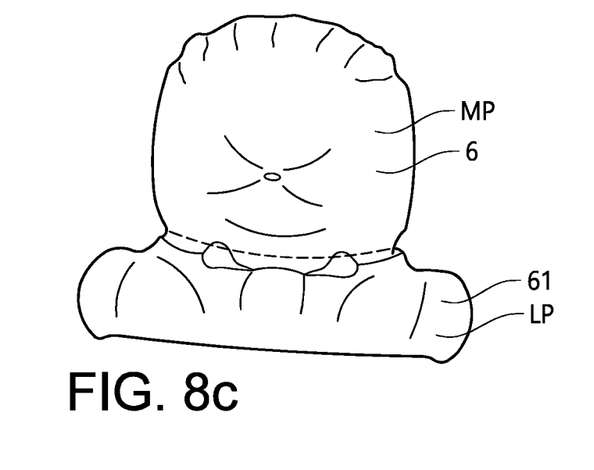

Now turning to FIGS. 8a-8c, three different examples of airbags 6 are disclosed where the lower portion LP comprises knee-protecting portions 61. The knee-protecting portions 61 are formed as projections that are configured to be deployed in a sideward direction, i.e. transverse to the longitudinal centreline of the vehicle. The knee protections 61 are configured to be deployed substantially in level with the knees of the driver as seen in the normally seated position. Thereby, an early coupling with the driver's femur/pelvis area will be further enabled and the loads to the femur and pelvis can thereby be reduced. The middle portions MP are like in the previous embodiments configured to abut the pelvis/abdomen/thorax area, and the upper portions UP configured to abut the head/facial area.

The embodiment of FIG. 8b differs from the embodiments of FIGS. 8a and 8c in that it further comprises shoulder-protecting portions 62 in the upper portion UP thereof. The shoulder-protecting portions 62 are formed as projections that are configured to be deployed in a sideward direction, i.e. transverse to the longitudinal centreline of the vehicle. The shoulder protections 62 are configured to be deployed in level with the head/facial area and/or in the chest/shoulder area of the driver as seen in the normally seated position.

The embodiment of FIG. 8c differs from the embodiments of FIGS. 8a and 8b in that the upper portion UP has been omitted.

An airbag 6 or the type having projections extending in the sideward direction may advantageously be configured to be arranged in the housing 2 in combined rolled and folded condition.

The skilled person realises that a number of modifications of the embodiments described herein are possible without departing from the scope of the disclosure, which is defined in the appended claims.

By way of example, the material of the airbag 6, may in said middle portion which is configured to abut the abdomen and thorax area of the driver in the deployed condition, be configured to be stretched during the deployment. The stretching will add an overall stiffness to the middle portion. This may be provided for by using different material types/properties in local surface areas of the airbag 6.

In the event the housing 2 or the cover 3 thereof comprises a padding, the padding may at least partially be formed by the packed airbag 6. This may be allowed by providing the cover 3 and/or housing 2 with different strength properties as seen across its surface extension.

The invention claimed is:

1. An airbag system for a powered saddle-ride vehicle, the airbag system comprising:
    a housing;
    an airbag arranged and packed in said housing in a folded condition; and
    an inflator,
    wherein the housing is elongated and has a longitudinal extension with two opposing flanks, a thickness and a height, the thickness being substantially smaller than the height and the longitudinal extension,
    wherein the inflator is arranged in a central position of the elongated housing where the housing has a locally enlarged depth as compared to a depth of the two opposing flanks,
    wherein the airbag is symmetrically arranged in the housing with a symmetric extension along the opposing flanks on opposite sides of the inflator,
    wherein the elongated housing is configured to face a driver,
    wherein the elongated housing is configured to be fixedly mounted to a leg shield next to a steering column of the vehicle in an area between handlebars of the vehicle and a foot support of the vehicle, and that the elongated housing is configured to be mounted in a substantially horizontal direction, transverse to a longitudinally extending centreline of the vehicle, and
    wherein the inflator is configured to allow the airbag, in the event of an activation signal, to inflate and deploy symmetrically on opposite sides of the longitudinally extending centreline of the vehicle to thereby fill an available space between the vehicle and the driver's pelvis, abdomen, thorax and head area.

2. The airbag system according to claim 1, wherein the airbag is arranged in the housing in a rolled condition, in a folded condition or in a combined rolled and folded condition.

3. The airbag system according to claim 1, wherein the housing comprises a cover configured to face the driver, and wherein said cover comprises a split line having an extension forming an open loop, whereby said cover upon an activation of the inflator is configured to rupture long said split line, thereby forming a deflector configured to guide deployment of the airbag in a direction transverse to the longitudinal extension of the elongated housing.

4. The airbag system according to claim 1, wherein the housing comprises a split line having an extension along at least a portion of the circumference of the housing, whereby said housing upon an activation of the inflator is configured to rupture long said split line, thereby forming a deflector configured to guide deployment of the airbag in a direction transverse to the longitudinal extension of the elongated housing.

5. The airbag system according to claim 1, wherein the housing is arranged substantially level with a saddle of the vehicle.

6. The airbag system according to claim 1, wherein the housing and/or a cover thereof comprise a padding on an exterior surface thereof.

7. The airbag system according to claim 1, wherein the airbag upon an activation is configured to be inflated and deployed to form an inflated body having a lower portion, a middle portion and an upper portion, said middle portion having a larger partial volume than the lower portion and the upper portion respectively.

8. The airbag system according to claim 7, wherein the lower portion in an inflated and deployed condition of the airbag has a width as seen along the longitudinal direction of the housing being smaller than a width of the middle portion and a width of the upper portion, wherein the width of the middle portion and the width of the upper portion are seen along the longitudinal direction of the housing.

9. The airbag system according to claim 7, wherein the lower portion in an inflated and deployed condition of the airbag comprises two knee-protecting portions, each portion extending in a direction transverse to the longitudinal centreline of the vehicle.

10. The airbag system according to claim 7, wherein the middle portion (MP) in the inflated and deployed condition of the airbag has a width as seen along the longitudinal direction of the housing being smaller than the distance between the handlebars of the vehicle but smaller than the width of the lower portion.

11. The airbag system according to claim 7, wherein the middle portion as seen in the inflated and deployed condition of the airbag is configured to abut the pelvis, abdomen and thorax area of the driver.

12. The airbag system according to claim 7, wherein the middle portion as seen in the inflated and deployed condition of the airbag has a substantially flat surface portion configured to abut the pelvis, abdomen and thorax area of the driver.

13. The airbag system according to claim 7, wherein the upper portion, as seen in the inflated and deployed condition of the airbag, has a width that is smaller than the width of the middle portion.

14. A powered saddle-ride vehicle provided with an airbag system according to claim 1, wherein the housing is fixedly mounted to a leg shield of a steering column of the vehicle in an area between handlebars of the vehicle and a foot support of the vehicle.

* * * * *